(12) United States Patent
Granger

(10) Patent No.: US 11,752,467 B2
(45) Date of Patent: Sep. 12, 2023

(54) METHOD FOR REMOVING NITROGEN OXIDES FROM A GAS

(71) Applicant: CASALE SA, Lugano (CH)

(72) Inventor: Jean Francois Granger, Lugano (CH)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 17/227,519

(22) Filed: Apr. 12, 2021

(65) Prior Publication Data

US 2021/0229035 A1  Jul. 29, 2021

Related U.S. Application Data

(63) Continuation of application No. 16/344,128, filed as application No. PCT/EP2017/074368 on Sep. 26, 2017, now abandoned.

(30) Foreign Application Priority Data

Oct. 28, 2016  (WO) ................. PCT/EP2016/076152
Apr. 28, 2017  (EP) ..................................... 17168721

(51) Int. Cl.
*B01D 53/86* (2006.01)
*B01D 53/90* (2006.01)

(52) U.S. Cl.
CPC ......... *B01D 53/8628* (2013.01); *B01D 53/90* (2013.01); *B01D 2251/2062* (2013.01); *B01D 2255/504* (2013.01); *B01D 2258/0283* (2013.01)

(58) Field of Classification Search
None
See application file for complete search history.

(56) References Cited

U.S. PATENT DOCUMENTS

| | | |
|---|---|---|
| 4,571,329 A | 2/1986 | Kato et al. |
| 7,462,340 B2 | 12/2008 | Schwefer et al. |
| 2002/0039550 A1 | 4/2002 | Schäfer-sindlinger et al. |
| 2003/0143141 A1 | 7/2003 | Schwefer et al. |
| 2003/0143142 A1 | 7/2003 | Schwefer et al. |
| 2006/0051277 A1 | 3/2006 | Schwefer et al. |
| 2008/0044331 A1 | 2/2008 | Schwefer et al. |
| 2013/0087181 A1 | 4/2013 | Koyuncu et al. |
| 2013/0336872 A1* | 12/2013 | Schwefer ............... C01B 21/265 422/162 |
| 2014/0044636 A1 | 2/2014 | Dandekar et al. |
| 2014/0363359 A1* | 12/2014 | Schwefer ............ B01D 53/8631 423/239.2 |
| 2018/0280873 A1 | 10/2018 | Granger |

OTHER PUBLICATIONS

International Preliminary Report on Patentability from International Application No. PCT/EP2017/074368 completed Feb. 20, 2019.
International Search Report from International Application No. PCT/EP2017/074368 dated Mar. 5, 2018.

* cited by examiner

*Primary Examiner* — Sheng H Davis
(74) *Attorney, Agent, or Firm* — Dorsey & Whitney LLP

(57) ABSTRACT

A method for removing nitrogen oxides NOx from a gaseous current, comprising the steps of: passing the gaseous current through a de-NOx catalytic bed with iron exchanged zeolite as a catalyst with the addition of ammonia as a reducing agent, wherein the molar ratio of NH3 over NOx is greater than 1.33.

17 Claims, No Drawings

METHOD FOR REMOVING NITROGEN OXIDES FROM A GAS

FIELD OF THE INVENTION

The invention relates to systems for removing nitrogen oxides from a gas.

PRIOR ART

Removal of nitrogen oxides (NOx) from a gas is of interest for environmental reasons. The flue gas of a combustion process typically contains NOx due to nitrogen and oxygen in the oxidant air reacting at the high temperature of combustion. A further case of interest is the removal of NOx from the tail gas of nitric acid production. Typically, in the nitric acid production, the tail gas denotes the gaseous current withdrawn from an absorption column where NOx is absorbed into water to produce nitric acid. The tail gas contains residual amounts of NOx which must be removed before the gas can be discharged.

A known measure to remove NOx from a gaseous current is passing the NOx-containing gas through a suitable catalytic bed with ammonia as a reducing agent. In the presence of ammonia, the nitrogen oxides are catalytically reduced to N2 and H2O.

The addition of ammonia needs be carefully regulated to reach a target removal of NOx while avoiding ammonia slip, i.e. that some ammonia escapes the catalytic bed. A content of ammonia in the output gas leaving the catalytic bed is undesirable, especially if the effluent gas of the catalytic bed is then discharged to atmosphere. The permissible content of ammonia in a gas discharged into atmosphere is generally very low, for example 5 ppm. In some countries, release of ammonia into atmosphere may be subject to a penalty fee.

Ammonia slip may also lead to formation of undesirable compounds such as ammonium nitrite or nitrate which can damage downstream equipment. For example the tail gas of nitric acid production is under pressure and is generally sent to an expander after removal of NOx. The above compounds may damage the expander.

SUMMARY OF THE INVENTION

It has been surprisingly found that ammonia slip is unexpectedly low, or negligible, when a NOx-containing gaseous current is passed through a de-NOx catalytic bed, wherein the catalytic bed comprises iron-exchanged zeolite catalyst and the molar ratio of NH3 over NOx in the gas admitted to the catalytic bed is relatively high, being greater than 1.33.

Accordingly, an object of the present invention is a method for removing NOx from a gaseous current according to claim 1. Preferred embodiments are disclosed in the dependent claims.

The term NOx denotes collectively NO and NO2.

The iron-exchanged zeolite catalyst, also termed iron-laden zeolite catalyst, is preferably any of: MFI, BEA, FER, MOR, FAU, MEL, or a combination thereof. Preferably, said iron exchanged zeolite is of the Fe-ZSM-5 type.

Preferably said ratio of NH3 over NOx is greater than 1.4, more preferably being 1.4 to 2, more preferably 1.4 to 1.6, even more preferably about 1.5. Preferred values include any of: 1.4, 1.45, 1.5, 1.55, 1.6.

After the passage though said de-NOx catalytic bed, the residual amount of NOx in the gas is preferably not greater than 100 ppm, preferably not greater than 50 ppm, more preferably not greater than 25 ppm. The term ppm denotes parts per million in volume.

In a preferred embodiment, said de-NOx catalytic bed is operated at a temperature in the range of 400 to 450° C., preferably 430° C. or around 430° C. Preferred working temperatures of the catalytic bed include: 420° C., 425° C., 430° C., 435° C.

The space velocity in said de-NOx catalytic bed is preferably 10000 $h^{-1}$ to 14000 $h^{-1}$, preferably 10000 to 13000 $h^{-1}$ and more preferably 13000 $h^{-1}$.

In some embodiments the NOx-containing gas is under pressure. In some embodiments the absolute pressure of the gas in said de-NOx catalytic bed is greater than 1 bar, preferably greater than 2 bar, more preferably 2 to 25 bar, even more preferably 5 to 15 bar.

The NOx-containing input gaseous current can be a flue gas of a combustion process, or a tail gas of a process for making nitric acid, namely a gas withdrawn from an absorption column. Removing environmental hazardous compounds from such tail gas (downstream of absorption column) is also termed tertiary abatement in contrast with primary and secondary abatement which are performed upstream the absorption column, or quaternary abatement which is performed after a subsequent expansion of the tail gas through an expander.

In an embodiment, the method of the invention does not comprise passing the NOx-containing gas (e.g. combustion flue gas or tail gas of nitric acid production) through a de-N2O catalytic bed before the passage through said de-NOx catalytic bed.

In an embodiment, the method of the invention does not comprise passing the NOx-containing gas (e.g. combustion flue gas or tail gas of nitric acid production) through a series of a further de-NOx catalytic bed and a subsequent de-N2O catalytic bed before the passage through said de-NOx catalytic bed.

The NOx-containing gas, however, may be passed through a first de-NOx catalytic bed and then into said de-NOx catalytic bed. An embodiment of the method of the invention includes: passing the NOx-containing gas through a first de-NOx catalytic bed, adding ammonia as a reducing agent to the effluent of said first-de-NOx catalytic bed until the molar ratio of NH3 over NOx in said effluent gas is greater than 1.33, preferably 1.4 to 1.6, passing the effluent gas and ammonia directly through said de-NOx catalytic bed without a passage through a de-N2O catalytic bed.

In some embodiments the ammonia can be pure or in the form of a reducing agent containing ammonia.

The catalytic bed of the invention can be contained in a suitable vessel and can be traversed with axial, radial or mixed axial/radial flow, according to different embodiments. More than one catalytic bed, if provided, can be arranged in the same pressure vessel or separate pressure vessels. More than one catalytic bed contained in a single pressure vessel can be arranged one above the other or concentrically.

The invention provides a certain excess ammonia in the de-NOx catalytic bed, the amount of ammonia being more than 1.33 moles per mole of NOx.

The applicant has found that, in a surprising manner, the combination of iron-laden zeolite catalyst and of the above NH3/NOx ratio, particularly with an operating temperature of the catalyst around 430° C., results in a virtual absence of ammonia slip, typically less than 1 ppm. At the same time, the nitrogen oxides are efficiently removed. Accordingly the invention provides a method which is able to meet the most stringent limits of NH3 and NOx for emission into atmosphere.

The invention will be now further elucidated with reference to a non-limitative example.

DETAILED DESCRIPTION

A NOx-containing gas, which can be a combustion flue gas or a tail gas of nitric acid production, is passed through a de-NOx catalytic bed with the addition of ammonia as a reducing agent and NH3/NOx ratio in the gas greater than 1.33.

The NOx-containing gas may be admitted directly to said de-NOx catalytic bed or, in some embodiments, can be subject to a preliminary treatment e.g. in another de-NOx catalytic bed.

For example, a gas containing 200 ppm of NOx and 10 ppm of N20, is passed through a de-NOx iron-laden zeolite catalytic bed with a space velocity of 13000 $h^{-1}$ at a pressure of 7 bar (absolute) and a temperature of 430° C. The gas is a tail gas of nitric acid production and further contains 3% oxygen and around 0.3% water. The NH3/NOx ratio was varied between 1.33 and 1.5.

Abatement of 99.4% NOx was observed with a NH3/NOx ratio of 1.4 and 99.7% was observed with a NH3/NOx ratio of 1.5. The ammonia content of the effluent gas was below measurement level, i.e. no ammonia slip was detected.

The invention claimed is:

1. A method for removing nitrogen oxides NOx from a gaseous current, the method comprising:
    passing the gaseous current through a first de-NOx catalytic bed and then into a second de-NOx catalytic bed, the second de-NOx catalytic bed including a catalyst that is an iron exchanged zeolite, with an addition of ammonia as a reducing agent;
    wherein a molar ratio of NH3 over NOx in the gas admitted to said second de-NOx catalytic bed is 1.4 to 2;
    wherein said second de-NOx catalytic bed is operated at a temperature in a range of 420° C. to 435° C.; and
    wherein a space velocity in said second de-NOx catalytic bed is 10000 h−1 to 14000 h−1.

2. The method according to claim 1, wherein said molar ratio of NH3 over NOx is 1.4 to 1.6.

3. The method according to claim 2, wherein said molar ratio of NH3 over NOx is 1.5.

4. The method according to claim 1, wherein, after the passage though said second de-NOx catalytic bed, a residual amount of NOx in the gas is not greater than 100 ppm.

5. The method according to claim 1, wherein, after the passage though said second de-NOx catalytic bed, a residual amount of NOx in the gas is not greater than 50 ppm.

6. The method according to claim 1, wherein, after the passage though said second de-NOx catalytic bed, a residual amount of NOx in the gas is not greater than 25 ppm.

7. The method according to claim 1, wherein the temperature at which said second de-NOx catalytic bed is operated is 430° C.

8. The method according to claim 1, wherein the iron exchanged zeolite catalyst includes MFI, BEA, FER, MOR, FAU, MEL, or combinations thereof.

9. The method according to claim 1, wherein the iron exchanged zeolite includes an Fe-ZSM-5 type iron exchanged zeolite.

10. The method according to claim 1, wherein the space velocity in said second de-NOx catalytic bed is 13000 h−1.

11. The method according to claim 1, wherein the gas in said second de-NOx catalytic bed exhibits an absolute pressure of greater than 1 bar.

12. The method according to claim 11, wherein the absolute pressure is 2 bar to 25 bar.

13. The method according to claim 11, wherein the absolute pressure is 5 bar to 15 bar.

14. The method according to claim 11, wherein the gaseous current is a flue gas of a combustion process, or a tail gas of a process for making nitric acid withdrawn from an absorption column.

15. The method according to claim 1 wherein the gaseous current is a tail gas of a process for making nitric acid, withdrawn from an absorption column.

16. The method according to claim 1, further comprising:
    adding ammonia as a reducing agent to the effluent of said first de-NOx catalytic bed until the molar ratio of NH3 over NOx in said effluent gas is 1.4 to 2; and
    passing the effluent gas and ammonia directly through said de-NOx catalytic bed.

17. The method according to claim 16 wherein adding ammonia as a reducing agent to the effluent of said first de-NOx catalytic bed until the molar ratio of NH3 over NOx in said effluent gas is 1.4 to 2 includes adding ammonia as the reducing agent to the effluent of said first de-NOx catalytic bed until the molar ratio of NH3 over NOx in said effluent gas is 1.4 to 1.6.

* * * * *